United States Patent
Bordin

(10) Patent No.: US 11,447,961 B2
(45) Date of Patent: Sep. 20, 2022

(54) PEDESTAL/STAND FOR RAISED FLOORS

(71) Applicant: PROGRESS PROFILES SPA, Asolo (IT)

(72) Inventor: Dennis Bordin, Asolo (IT)

(73) Assignee: PROGRESS PROFILES SPA, Asolo (IT)

( * ) Notice: Subject to any disclaimer, the term of this patent is extended or adjusted under 35 U.S.C. 154(b) by 0 days.

(21) Appl. No.: 17/012,290

(22) Filed: Sep. 4, 2020

(65) Prior Publication Data

US 2021/0062519 A1    Mar. 4, 2021

(30) Foreign Application Priority Data

Sep. 4, 2019   (IT) .................. 102019000015545

(51) Int. Cl.
*E04F 15/02* (2006.01)
*E04F 21/20* (2006.01)

(52) U.S. Cl.
CPC ........ *E04F 15/02044* (2013.01); *E04F 21/20* (2013.01); *E04F 2015/021* (2013.01); *E04F 2015/02072* (2013.01); *E04F 2015/02116* (2013.01)

(58) Field of Classification Search
CPC .......... E04F 15/02044; E04F 15/02452; E04F 15/02458; E04F 21/20; E04F 2015/0205; E04F 2015/02072; E04F 2015/02077; E04F 2015/021; E04F 2015/02116
See application file for complete search history.

(56) References Cited

U.S. PATENT DOCUMENTS

| | | | | |
|---|---|---|---|---|
| 2,956,653 A | * | 10/1960 | Liskey, Jr. ........ | E04F 15/02405 52/396.06 |
| 3,150,748 A | * | 9/1964 | Liskey, Jr. ........ | E04F 15/02405 52/396.04 |
| 3,180,460 A | * | 4/1965 | Liskey, Jr. ........ | E04F 15/02435 52/177 |
| 3,298,153 A | * | 1/1967 | Rolland ............ | E04B 5/14 52/456 |
| 3,318,057 A | * | 5/1967 | Norsworthy ...... | E04F 15/02482 52/126.6 |
| 5,048,242 A | * | 9/1991 | Cline ............... | E04F 15/02458 52/126.6 |
| 5,675,950 A | * | 10/1997 | Schilham .......... | H02G 3/185 52/510 |

(Continued)

FOREIGN PATENT DOCUMENTS

| | | |
|---|---|---|
| CA | 2843068 A1 | 8/2014 |
| CN | 1159845 A | 9/1997 |

(Continued)

OTHER PUBLICATIONS

IT Search Report dated May 6, 2020 re: Application No. IT 102019000015545, pp. 1-10, citing: DE 10 2013 019133 A1, DE 20 2012 104056 U1, US 2004/261329 A1 and FR 3 072 700 A1.

*Primary Examiner* — James M Ference
(74) *Attorney, Agent, or Firm* — Cantor Colburn LLP

(57) ABSTRACT

A pedestal/stand for raised floors can be applied on a number of heads of supports for raised floors. The pedestal/stand may include at least one beam. The beam is of a contoured type and includes at least one zone for interlocking mechanical association with the number of heads of the supports.

8 Claims, 7 Drawing Sheets

(56) References Cited

U.S. PATENT DOCUMENTS

| | | | | |
|---|---|---|---|---|
| 5,848,501 | A * | 12/1998 | Taipale | E04F 11/002 |
| | | | | 52/126.4 |
| 6,363,685 | B1 * | 4/2002 | Kugler | E04F 15/02183 |
| | | | | 52/126.6 |
| 8,850,753 | B2 * | 10/2014 | Tabibnia | E04F 15/02452 |
| | | | | 52/126.6 |
| 9,038,324 | B2 * | 5/2015 | Kugler | E04F 15/02458 |
| | | | | 52/126.6 |
| 9,556,621 | B2 * | 1/2017 | Pelc | E04F 15/02452 |
| 9,803,377 | B2 * | 10/2017 | Pelc, Jr. | E04F 15/02452 |
| 2002/0194801 | A1 * | 12/2002 | Jette | E04F 15/02458 |
| | | | | 52/220.8 |
| 2004/0065028 | A1 * | 4/2004 | Wu | E04F 19/08 |
| | | | | 52/196 |
| 2004/0261329 | A1 * | 12/2004 | Kugler | E04F 15/02183 |
| | | | | 52/126.6 |
| 2012/0131862 | A1 * | 5/2012 | Hashimoto | E04F 15/02452 |
| | | | | 52/126.6 |
| 2017/0152635 | A1 * | 6/2017 | Tabibnia | E04F 15/02476 |
| 2017/0260699 | A1 * | 9/2017 | Tabibnia | E04F 15/02452 |
| 2019/0368203 | A1 * | 12/2019 | Bordin | E04F 15/02476 |
| 2021/0062519 | A1 * | 3/2021 | Bordin | E04F 21/20 |

FOREIGN PATENT DOCUMENTS

| | | |
|---|---|---|
| CN | 103228853 A | 7/2013 |
| CN | 104005535 A | 8/2014 |
| CN | 209194920 U | 8/2019 |
| DE | 202012104056 U1 | 1/2014 |
| DE | 102013019133 A1 | 5/2015 |
| EP | 2333196 A1 | 6/2011 |
| FR | 3072700 A1 | 4/2019 |

* cited by examiner

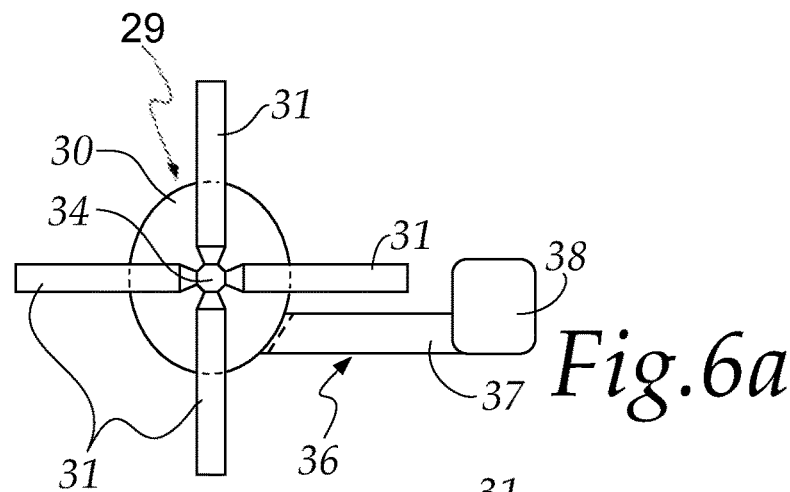
Fig.6a
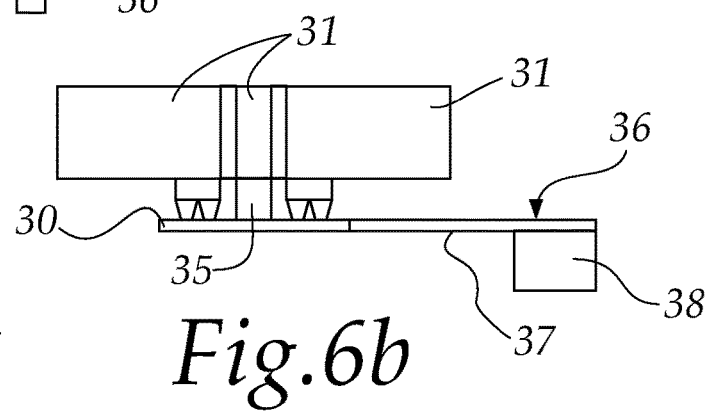
Fig.6b
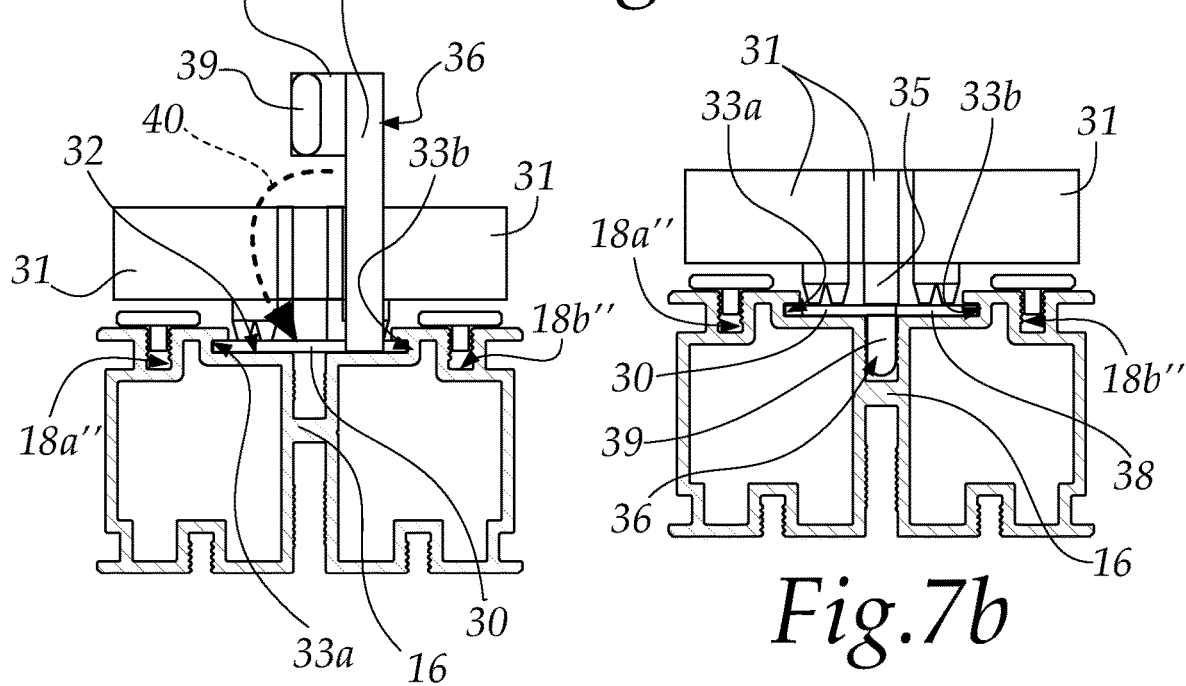
Fig.7a
Fig.7b

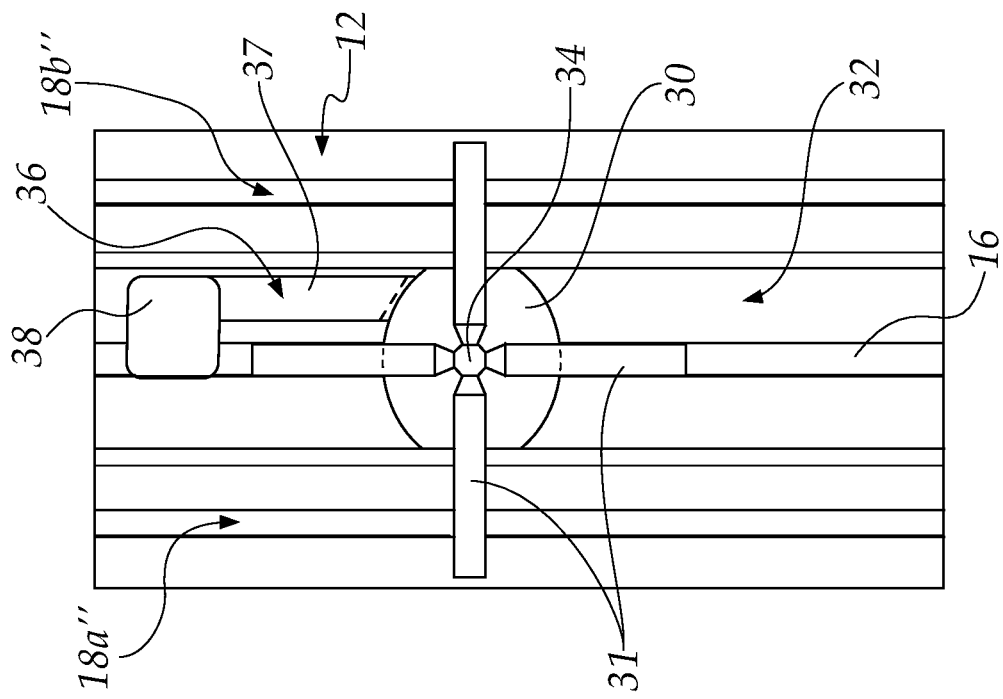
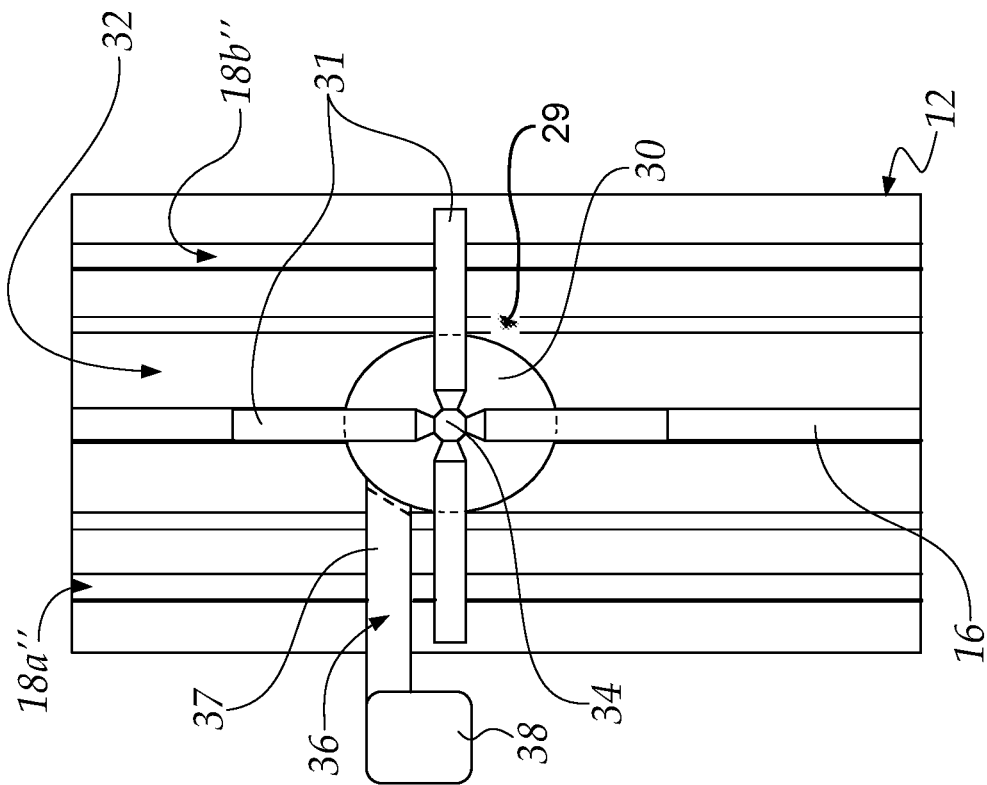

PEDESTAL/STAND FOR RAISED FLOORS

CROSS REFERENCE TO RELATED APPLICATIONS

This application is related to and claims the benefit of Italian Patent Application No. 102019000015545, filed on Sep. 4, 2019, the contents of which are herein incorporated by reference in their entirety.

TECHNICAL FIELD

The present disclosure relates to a pedestal/stand for raised floors.

The disclosure is applied in the construction sector for providing raised floors.

BACKGROUND

Nowadays, raised floors are widespread and are applied when, for example, the cabling of electrical systems, water pipes and/or pipes for heating and cooling need to be installed between a floor and a lower surface.

In other cases, the use is made of raised floors when there is a need to directly apply flooring surfaces without adhesive bonding.

Normally, raised floors rest on supports, which are placed between the floor and the lower surface.

The supports are distributed uniformly on the lower surface in order to cooperate in supporting the panels or slabs of the floor.

Such supports have a base, which rests on the lower surface, a head on which portions of one or more slabs of the floor rest, generally the contiguous corners of four slabs, and a connection and separation element, usually tubular, between the head and the base.

The lower surface can be a horizontally-extending floor, a floor with a slope, or any other surface suitable for laying a raised flooring surface, on which it is intended to position a raised floor.

In some cases, in order to obtain a perfectly leveled raised floor, above the supports, and in particular above the heads, pedestals/stands are arranged on which the slabs of the floor are subsequently laid.

These pedestals/stands usually comprise a beam, on which can be arranged:
noise-reduction and anti-skid rubber portions,
cross-shaped elements, for easy positioning of the slabs and to make them equidistant at their corners.

Such conventional techniques have a number of drawbacks.

The beams currently used on the market do not have zones and/or seats for inserting noise-reduction and anti-skid rubber portions, so these are applied simply by placing them on the beam, with the risk that they could move, and/or adhesive rubber tapes are used which can move over time, and this entails the need for an additional operation.

Furthermore, nowadays, in order to be capable of fixing the cross-shaped elements on a beam it is necessary to use fixing screws, and this entails a lengthening of the necessary time to provide the floor and the need to use a considerable number of parts.

Also, on the market there are substantially two families of beams:
non-contoured beams, which have the outer surfaces substantially uniform,
contoured beams, which have the outer surfaces contoured.

In order to be capable of anchoring the beams to the heads of the supports, mutual association elements are necessary.

Furthermore, such mutual association elements are specific to the type of beam and this results in the need for the installation technician to have several different types of elements for association with the supports, requiring considerable warehouse space.

SUMMARY

The aim of the present disclosure is to provide a pedestal/stand for raised floors which is capable of improving the known art in one or more of the above mentioned aspects.

Within this aim, the disclosure provides a pedestal/stand for raised floors that can be used on heads of supports and which does not require additional elements for association with such heads.

The disclosure also provides a pedestal/stand for raised floors that can be used both with contoured beams and with non-contoured beams.

The disclosure further provides a pedestal/stand for raised floors that has special seats for noise-reduction and anti-skid rubber portions.

The disclosure provides a pedestal/stand for raised floors in which any cross-shaped elements do not require the use of fixing screws to be anchored to the beam.

The present disclosure still further overcomes the drawbacks of the known art in an alternative manner to any existing solutions.

The disclosure also provides a pedestal/stand for raised floors which is highly reliable, easy to implement and of low cost.

This aim and these and other advantages which will become better apparent hereinafter are achieved by providing a pedestal/stand for raised floors, which can be applied on a plurality of heads of supports for raised floors, comprising at least one beam, and characterized in that said beam is of the contoured type and comprises at least one zone for interlocking mechanical association with said heads of supports.

BRIEF DESCRIPTION OF THE DRAWINGS

Further characteristics and advantages of the disclosure will become better apparent from the description of some preferred, but not exclusive, embodiments of the pedestal/stand for raised floors, according to the disclosure, which are illustrated for the purposes of non-limiting example in the accompanying drawings wherein:

FIGS. 6a and 6b are two different views of a third detail of a pedestal/stand for raised floors, according to the disclosure;

FIGS. 7a and 7b show two steps of applying the detail of FIGS. 6a and 6b;

FIGS. 8a-8d show different steps and applications of a pedestal/stand for raised floors, according to the disclosure, with the detail of FIGS. 6a and 6b;

DETAILED DESCRIPTION OF THE DRAWINGS

Figure 1:
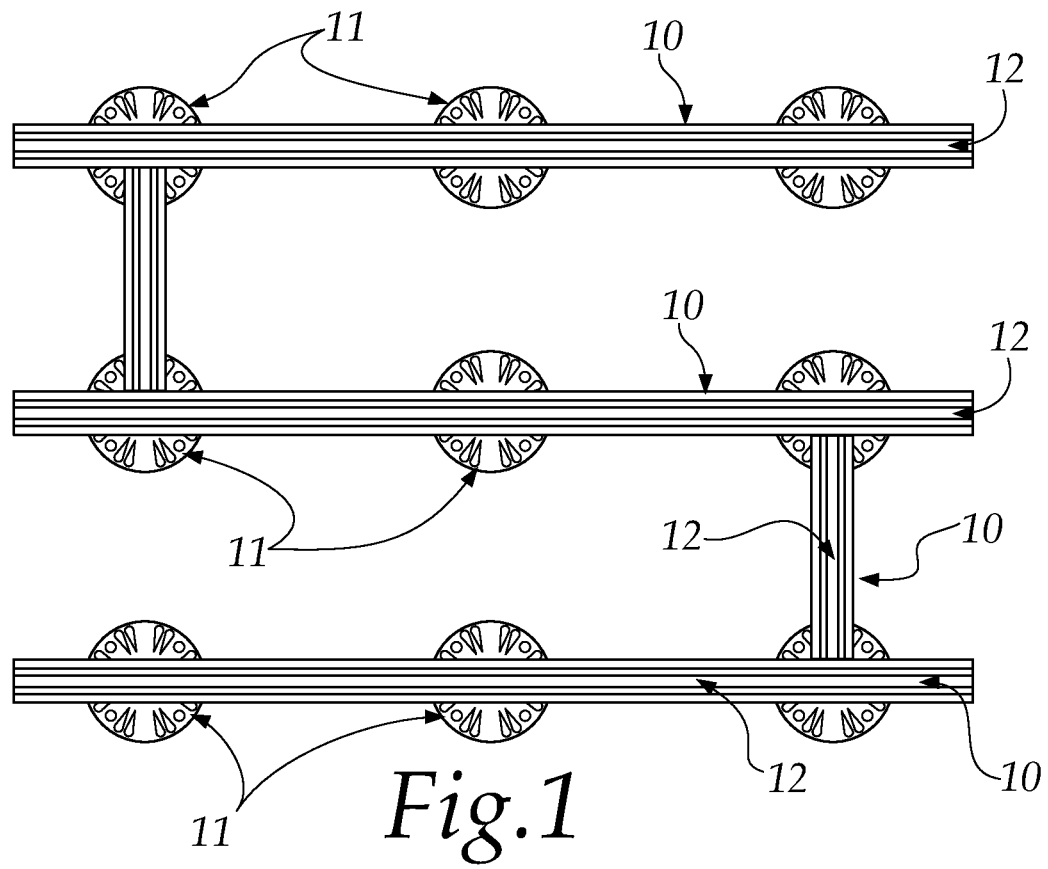
FIG. 1 is a view from above of a pedestal/stand for raised floors, according to the disclosure, in an application of a first embodiment.

With reference to the figures, a pedestal/stand according to the disclosure, in a first embodiment, is generally designated by the reference numeral 10.

The pedestal/stand 10 is applied on a plurality of heads 11 of supports for raised floors.

Such heads 11 are for example of the type described in Italian patent application no. 102018000006024 of 5 Jun. 2018, by the same applicant, and comprise a plurality of tabs 13.

The pedestal/stand 10 comprises at least one beam 12.

The beam 12 is made of metallic material such as, for example, aluminum.

One of the peculiarities of the disclosure is that the beam 12 is of the contoured type and comprises at least one zone 14 for mechanical association with one or more tabs 13 of the heads 11 of the supports.

Figure 2:
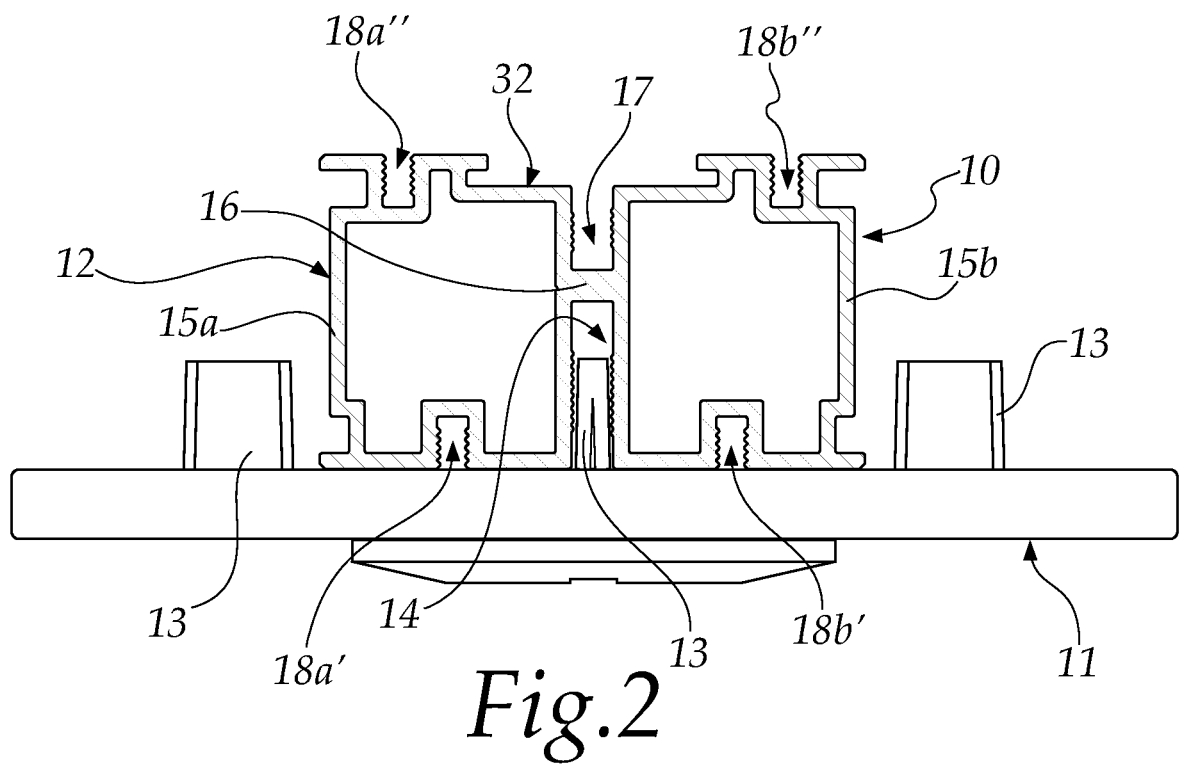
FIG. 2 is a cross-sectional view of the pedestal/stand for raised floors of FIG. 1.
Figure 3:
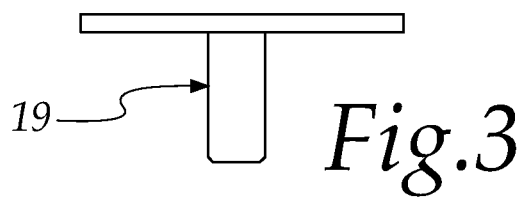
FIG. 3 is a cross-sectional view of a first detail of a pedestal/stand for raised floors, according to the disclosure.

In particular, considering the cross-section of the beam 12, shown in FIG. 2, the beam 12 is constituted by two tubular bodies 15a and 15b, which are substantially quadrangular in cross-section.

Such tubular bodies 15a and 15b are symmetrical with respect to the zone 14 for mechanical association with the tabs 13 and are joined by a bridge 16, adjacent to such zone 14.

In particular, the zone 14 for mechanical association is a first longitudinally extended slit, always designated with the reference numeral 14, of such breadth as to snugly fit a tab 13 inside it, when inserted.

Between the two tubular bodies 15a and 15b, there is also a second longitudinally extended slit 17, which is opposite to the first slit 14 with respect to the bridge 16.

Such second slit 17 has a substantially equal breadth to that of the first slit 14, but is not as deep.

Figure 5A:
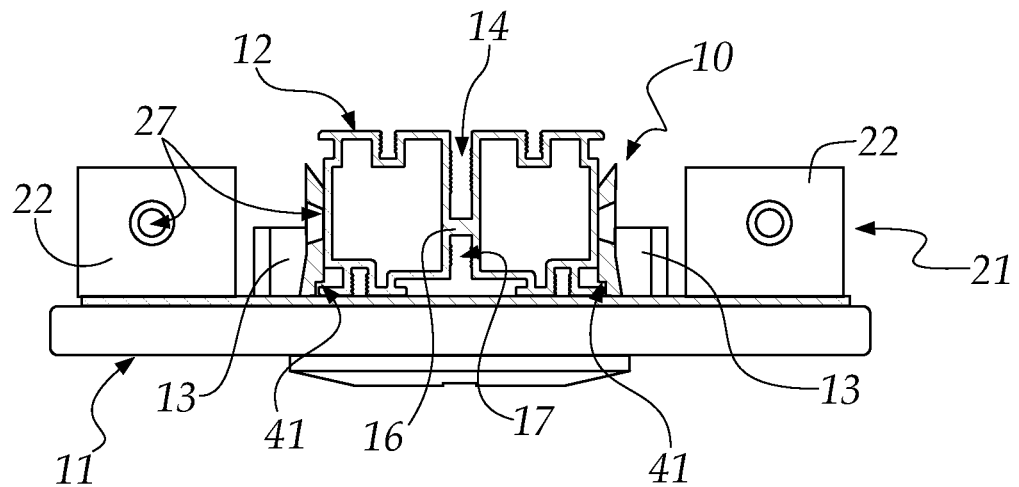
FIGS. 5a and 5b are two cross-sectional views of a pedestal/stand for raised floors, according to the disclosure, in a second embodiment.
Figure 5B:
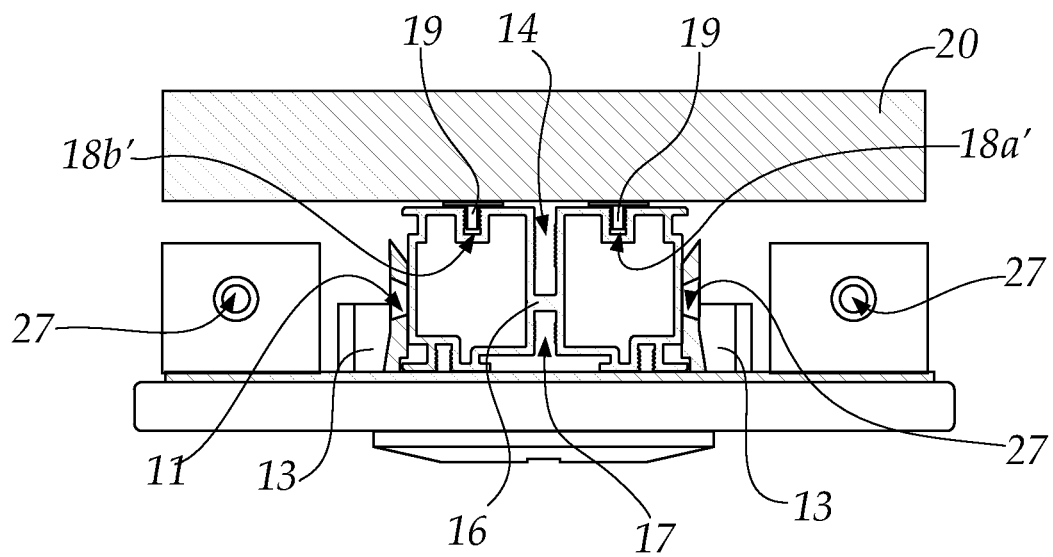

As can be seen from the figures, the beam 12 can be used, according to requirements:
either with the first slit 14 directed upward and the second slit 17 directed toward the heads 11, FIG. 5a: in this configuration the beam 12 fits between the tabs 22 of the association element 21,
or with the second slit 17 directed upward and the first slit 14 directed toward the heads 11, FIG. 2: in this configuration the beam 12 fits between the tabs 13 of the heads 11 without necessitating the use of the association element 21.

In the first slit 14 and in the second slit 17 it is possible to screw one or more self-tapping screws, not shown in the figures, in order to be able to fix, for example, elements of wood and/or other flooring surface elements of conventional type to the beam 12.

Each tubular body 15a, 15b has two longitudinal secondary slits, respectively: 18a', 18a", 18b' and 18b".

Each one of these secondary slits 18a', 18a", 18b', 18b" is arranged on the outer surface of one of the walls of the respective tubular body 15a, 15b, parallel to the bridge 16.

It is possible to insert one or more noise reduction and/or anti-skid elements 19 for the pedestal/stand 10 in such secondary slits 18a', 18a", 18b', 18b".

The noise reduction and/or anti-skid elements 19 are adapted to impede the slipping of the slabs 20 and to reduce the noise generated by footfalls.

The noise reduction and/or anti-skid element 19 is T-shaped in cross-section and can, alternatively:
have a longitudinal extension and extend substantially along the whole of the beam 12,
have a reduced dimension and be positioned locally only where necessary.

It is possible to insert one or more fixing elements and/or other flooring surface elements of conventional type in the secondary slits 18a', 18a", 18b', 18b".

During the installation of the raised floor, not shown in the figures, above the beam 12, optionally provided with noise reduction and/or anti-skid elements 19, one or more floor slabs 20 are arranged.

During installation of the raised floor, the beam 12 of the pedestal/stand 10 is placed on the heads 11 and associated with them by way of fitting at least one of the tabs 13 in the first longitudinal slit 14.

Alternatively, the pedestal/stand 10 comprises an association element 21 for associating the beam 12 with the head 11.

Such association element 21 has a substantially annular body 24 with:
a plurality of first tabs 22, which extend from the surface of the annular body 24 that is directed toward the beam 12,
a plurality of second tabs 23, which extend from the surface of the annular body 24 that is opposite to the surface from which the first tabs 22 extend.

Figure 10:
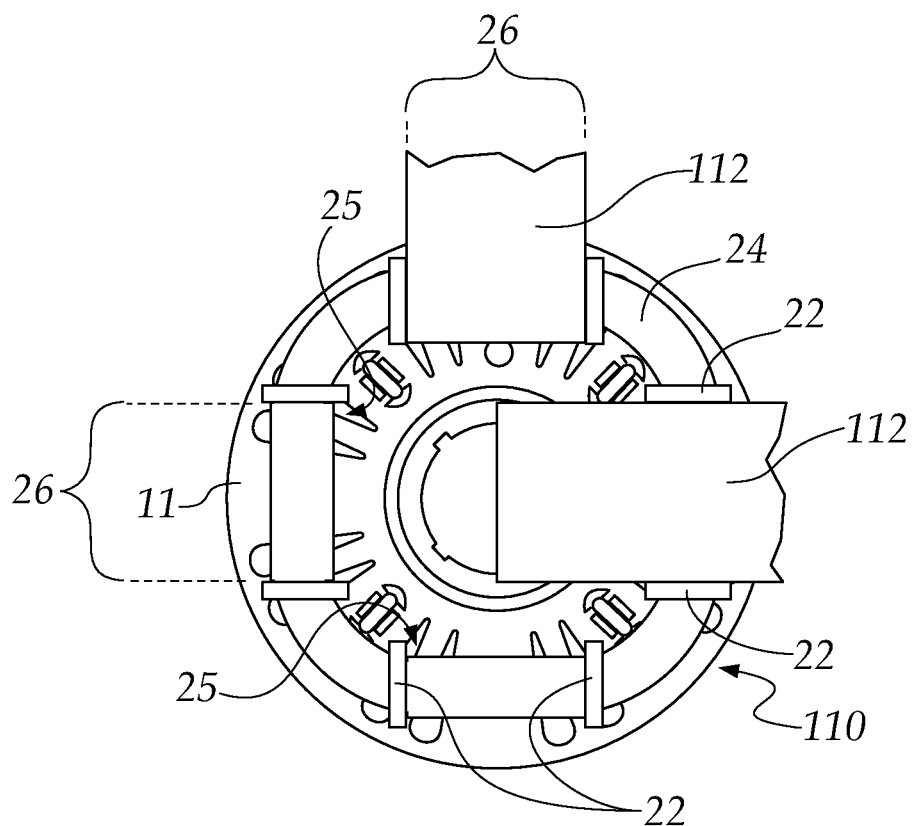
FIG. 10 is a specific view, enlarged, of a portion of FIG. 9.

The second tabs 23 are each adapted to be inserted into an opening 25 of a head 11, as can be seen in FIG. 10.

The first tabs 22 are arranged so as to produce, in pairs, four portions 26 for accommodating and gripping a beam 12.

Figure 4A:
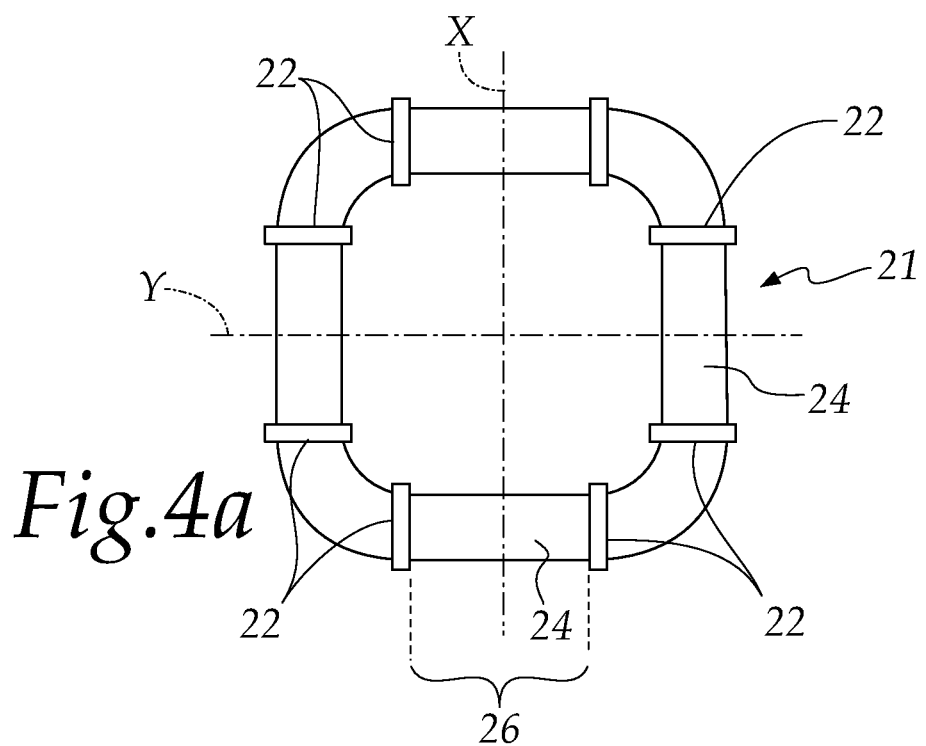
FIGS. 4a and 4b are a view from above and a side view of a second detail of a pedestal/stand for raised floors, according to the disclosure.
Figure 4B:
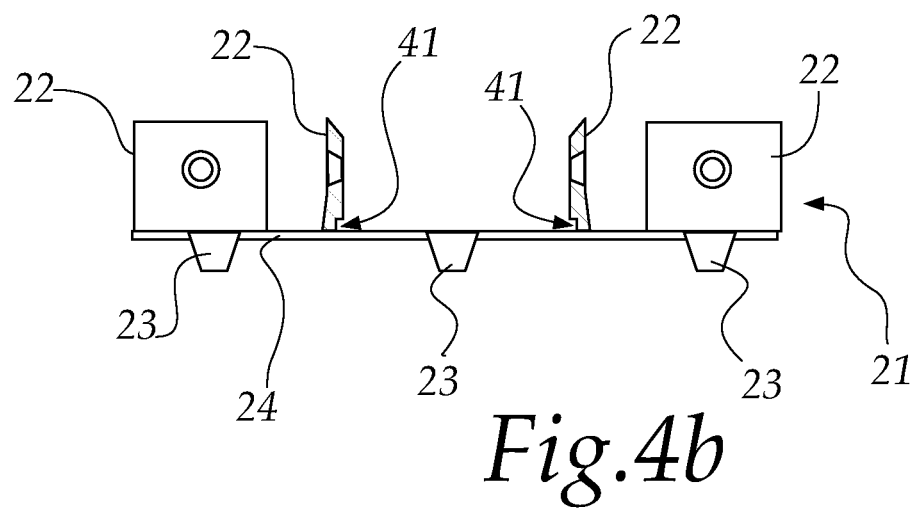

In particular there are eight first tabs 22, arranged two by two, in opposing and symmetrical pairs, and they define substantially two crossed directions X and Y for accommodating the beams, as can be seen in FIGS. 4a and 10.

The association element 21 is made of plastic material.

The first tabs 22 have, proximate to the substantially annular body 24, grooves 41 for inserting a complementarily shaped portion of the beam 12, in order to immobilize the beam 12 in the association element 21.

The first tabs 22 have a thickness comprised between 1 mm and 10 mm.

Each first tab 22 has one or more holes 27 that pass through the respective first tab.

Figure 11:
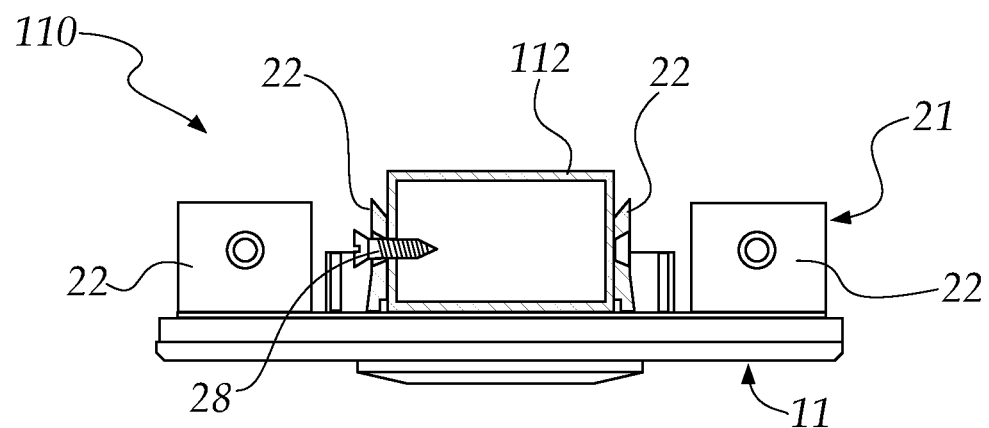
FIG. 11 is a cross-sectional view of the pedestal/stand for raised floors of FIG. 9.

These through holes 27 are adapted for the insertion of screws 28 for fixing to a beam, in a different embodiment, as shown in FIG. 11 and explained below.

During installation and use of the raised floor, this association element 21 of the pedestal/stand 10 is arranged between a head 11 and a beam of the pedestal/stand 10, and is associated with both.

With reference to FIGS. 6a to 8b, the pedestal/stand 10 can comprise a cross-shaped element 29, cross-shaped elements, for easy positioning of the slabs 20 and to make them equidistant.

The cross-shaped element 29 comprises a base 30, with an oval profile, to be associated with the beam 12, from which four removable wings 31 extend in pairs along two crossed directions, at right angles to the plane of arrangement of the base 30.

In particular, the beam 12 has a portion 32 for accommodating one or more bases 30 of a cross-shaped element 29.

The portion 32 for accommodating at least one cross-shaped element 29 has a longitudinal extension and is arranged between two laterally adjacent secondary grooves 18a" and 18b", parallel to and superimposed on the bridge 16 in the configuration for use, as can be seen in FIGS. 7a and 7b.

Such portion 32 for accommodating at least one cross-shaped element 29 has, along its two longitudinal edges, two longitudinal recesses 33a and 33b, which are symmetrical with respect to a longitudinal plane of symmetry that is perpendicular to the bridge 16.

The longitudinal recesses 33a and 33b are adapted to generate an interference with the perimetric edge of the base 30, trapping it in the beam 12.

Figures 8C, 8D:
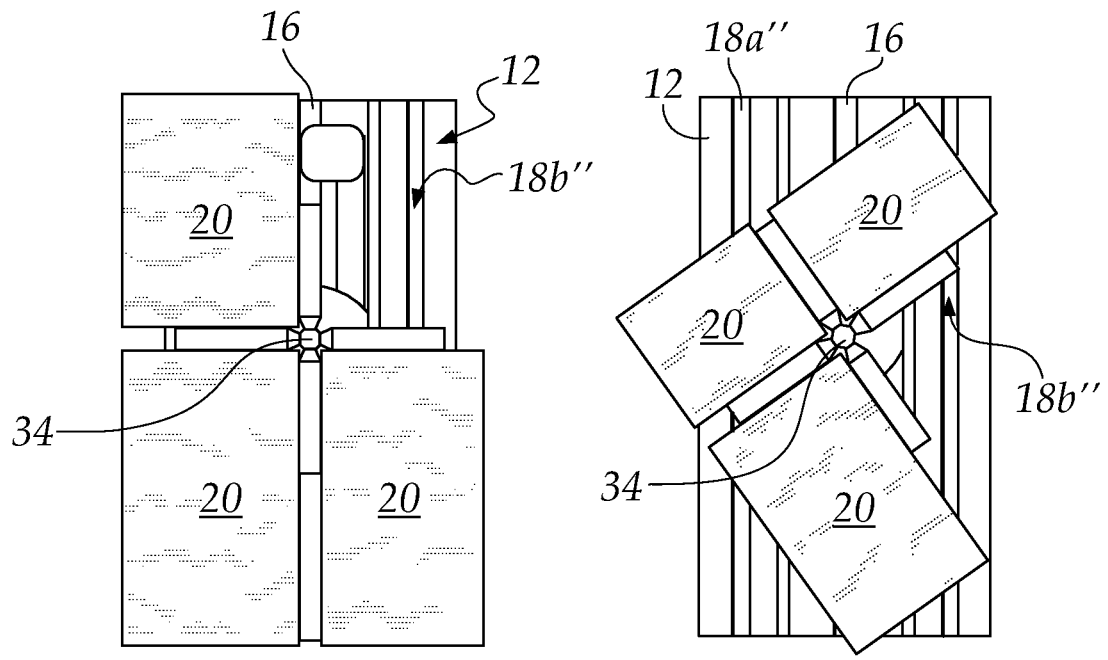

For example, the base 30 can be inserted in the accommodation portion 32 keeping its major axis parallel to the longitudinal axis of the beam 12 (FIG. 8a) and, once placed on the beam 12, the base 30 is rotated, arranging its minor axis parallel to the longitudinal axis of the beam 12, in this manner bringing some zones of its perimetric edge into the longitudinal recesses 33a and 33b (FIG. 8b).

The four wings 31 have one end integral with a body 34 which extends from the center of the base 30, monolithically with and perpendicularly to it.

The cross-shaped element 29 can comprise an anchoring lug 36 for anchoring to the beam 12.

The anchoring lug 36 has a strip 37 which extends starting from the base 30 and lies on the same plane thereof in the configuration for use.

At the free end of the strip 37 there is an element with a substantially square profile 38 and, at right angles to this, an interlocking tab 39.

The interlocking tab 39 is inserted and interlocked in the second slit 17.

FIGS. 7a and 7b show two steps of associating the cross-shaped element 29 with the beam 12.

Once the base 30 is positioned with its edges trapped in the recesses 33a and 33b, the anchoring lug 36 is lowered in the direction of the arrow 40, of FIG. 7a, bringing the interlocking tab 39 into the second slit 17.

The anchoring lug 36 prevents the cross-shaped element 29 from sliding along the beam 12.

In another embodiment, not shown in the figures, the cross-shaped element 29 is provided without the anchoring lug.

Figure 9:
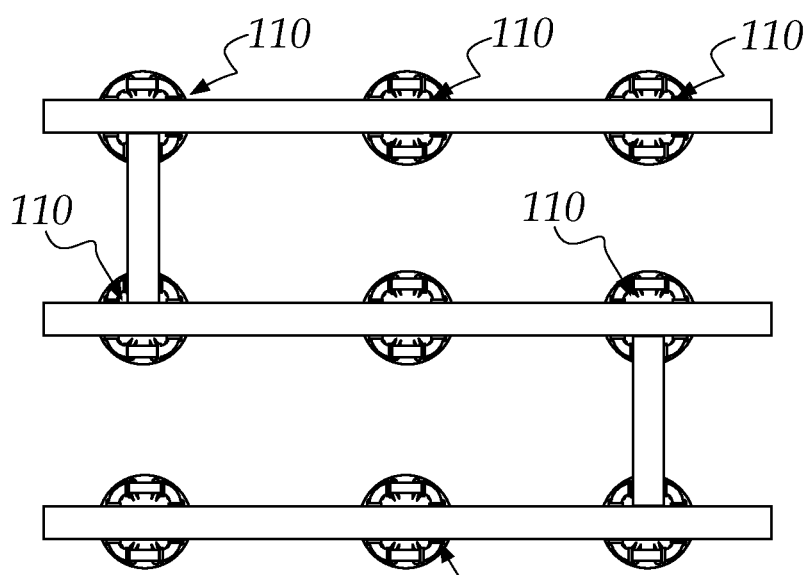
FIG. 9 is a view from above of a pedestal/stand for raised floors, according to the disclosure, in an application of a second embodiment.

FIGS. 9 to 11 show a stand/pedestal 110, according to the disclosure, in a different embodiment.

The stand/pedestal 110 is arranged on a plurality of heads 11, like the ones described previously.

The stand/pedestal 110 comprises an association element 21, described previously, associated with each head 11 and a beam 112, of the non-contoured type, such as for example a beam of aluminum or wood that is already available on the market.

The beam 112 is made of metallic material such as, for example, aluminum, or of wood, and is quadrangular in cross-section.

The beam 112 is optionally fixed to the association element 21 by way of at least one self-tapping screw 28, which is inserted into a through hole 27 of a first tab 22 on the beam 112, as shown in FIG. 11.

It should be noted that with a stand/pedestal according to the disclosure it is possible to use rubber anti-skid and noise reduction elements easily, without the risk of their moving and without the need to fix them to the beam using additional elements.

Furthermore, with the disclosure it is possible to use cross-shaped elements without the need to use fixing screws.

Also, with the disclosure a stand/pedestal has been devised that can be used both with contoured beams and with non-contoured beams and which does not require elements for association with the heads of the supports which are specific to the type of beam.

In practice it has been found that the disclosure fully achieves the intended aim and advantages by providing a pedestal/stand for raised floors that can be used on heads of supports and which does not require additional elements for association with such heads.

With the disclosure a pedestal/stand for raised floors has been devised that can be used both with contoured beams and with non-contoured beams.

Also, with the disclosure a pedestal/stand for raised floors has been provided that has special seats for noise-reduction and anti-skid rubber portions.

Finally, with the disclosure a pedestal/stand for raised floors has been devised in which any cross-shaped elements do not require the use of fixing screws to be anchored to the beam.

The disclosure thus conceived is susceptible of numerous modifications and variations, all of which are within the scope of the appended claims. Moreover, all the details may be substituted by other, technically equivalent elements.

In practice the materials employed, provided they are compatible with the specific use, and the contingent dimensions and shapes, may be any according to requirements and to the state of the art.

The beam is of the contoured type and comprises at least one zone for interlocking mechanical association with the heads of supports.

What is claimed is:

1. A pedestal/stand for raised floors configured to be applied on a plurality of heads of supports for raised floors, said pedestal/stand comprising at least one beam, wherein said beam comprises at least one zone adapted for interlocking mechanical association with said heads of supports, wherein said beam is constituted by two tubular bodies substantially quadrangular in cross-section, said tubular bodies being symmetrical with respect to said at least one zone for interlocking mechanical association with said heads of supports, said tubular bodies being joined by a bridge adjacent to said at least one zone for interlocking mechanical association with said heads of supports, wherein each one of said tubular bodies has two longitudinal secondary slits, each one of said two longitudinal secondary slits being arranged on an outer surface of a wall of a respective one of said tubular bodies which are parallel to said bridge, and further comprising one or more noise reduction and/or anti-skid elements inserted in said two longitudinal secondary slits, said one or more noise reduction and/or anti-skid elements being T-shaped in cross-section.

2. The pedestal/stand according to claim 1, wherein said at least one zone for interlocking mechanical association with said heads of supports is a first longitudinally extended slit, and a second longitudinally extended slit disposed between said two tubular bodies and being opposite to said first slit with respect to said bridge.

3. The pedestal/stand according to claim 1, further comprising an association element configured for anchoring said beam with one of said heads of supports, said association element having a substantially annular body with:

a plurality of first tabs, which extend from a surface of said annular body that is directed toward said beam, a plurality of second tabs, which extend from the surface of said annular body that is opposite to a surface of extension of said first tabs.

4. The pedestal/stand according to claim 3, wherein said first tabs are arranged to produce, in pairs, four portions for accommodating and gripping said beam.

5. The pedestal/stand according to claim 3, wherein each one of said first tabs has one or more holes that pass through a thickness of said first tabs.

6. A pedestal/stand for raised floors configured to be applied on a plurality of heads of supports for raised floors, said pedestal/stand comprising at least one beam, wherein said beam comprises at least one zone adapted for interlocking mechanical association with said heads of supports, further comprising at least one cross-shaped element comprising a base with an oval profile associated with said beam, four removable wings extending from said base, said wings extending in pairs along two crossed directions, at right angles to a plane of arrangement of said base, said beam having a portion for accommodating said base, said portion for accommodating said base having a longitudinal extension and being arranged between two laterally adjacent said secondary grooves, parallel to and superimposed on said bridge in a configuration for use, said portion for accommodating said base having, along two longitudinal edges thereof, two longitudinal recesses, said longitudinal recesses being symmetrical with respect to a longitudinal plane of symmetry that is perpendicular to said bridge.

7. The pedestal/stand according to claim 6, wherein each of said removable wings has an end that is monolithically integral with a body and at right angles to said body.

8. The pedestal/stand according to claim 6, wherein said cross-shaped element comprises a lug for anchoring to said beam, said anchoring lug having a strip which extends starting from said base and lies on the same plane as said base in the configuration for use, at a free end of said strip there being an element having a substantially square profile and, at right angles to said element, an interlocking tab, said interlocking tab being inserted and interlocked in said second slit.

* * * * *